(12) United States Patent
Krysiuk

(10) Patent No.: US 10,373,494 B1
(45) Date of Patent: Aug. 6, 2019

(54) METHOD AND APPARATUS FOR ESTIMATING A PARKING EVENT BASED ON DEVICE SIGNAL OBSERVATIONS

(71) Applicant: HERE GLOBAL B.V., Eindhoven (NL)

(72) Inventor: Marek Krysiuk, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/975,415

(22) Filed: May 9, 2018

(51) Int. Cl.
| | |
|---|---|
| B60Q 1/48 | (2006.01) |
| G08G 1/14 | (2006.01) |
| H04W 8/22 | (2009.01) |
| G01C 21/36 | (2006.01) |
| H04W 4/02 | (2018.01) |
| H04W 24/10 | (2009.01) |

(52) U.S. Cl.
CPC ............ *G08G 1/144* (2013.01); *G01C 21/36* (2013.01); *G08G 1/147* (2013.01); *H04W 4/023* (2013.01); *H04W 8/22* (2013.01); *H04W 24/10* (2013.01)

(58) Field of Classification Search
CPC .......... G08G 1/143; G08G 1/144; H04W 4/02
USPC ............ 340/932.2, 539.12, 539.32, 540, 541
See application file for complete search history.

(56) References Cited

U.S. PATENT DOCUMENTS

| | | | |
|---|---|---|---|
| 9,008,647 | B2 | 4/2015 | Bienas et al. |
| 9,558,664 | B1 * | 1/2017 | Gaebler ............. G01C 21/3492 |
| 2015/0279213 | A1 | 10/2015 | Balter et al. |
| 2016/0364985 | A1 * | 12/2016 | Penna .................... G08G 1/143 |
| 2017/0243487 | A1 | 8/2017 | Levy et al. |
| 2017/0280281 | A1 * | 9/2017 | Pandey ................... H04W 4/02 |
| 2017/0358208 | A1 * | 12/2017 | Kazemi ................. G08G 1/123 |

FOREIGN PATENT DOCUMENTS

WO 2017191557 A1 11/2017

* cited by examiner

*Primary Examiner* — Tai T Nguyen
(74) *Attorney, Agent, or Firm* — Ditthavong & Steiner, P.C.

(57) ABSTRACT

An approach is provided for estimating parking or other mobility events. The approach, for instance, involves receiving a signal strength profile of a user device with respect to a location-fixed communication equipment (e.g., a base station). The signal strength profile comprises signal strength data for the user device measured over a time series by the location-fixed communication equipment. The approach also involves processing the signal strength profile to determine a signal strength change over the time series. The approach further involves identifying a parking event (e.g., a park-in event or a park-out event) or other mobility event of a vehicle occurring in a geographic area covered by the location-fixed communication equipment based on the signal strength change.

20 Claims, 11 Drawing Sheets

METHOD AND APPARATUS FOR ESTIMATING A PARKING EVENT BASED ON DEVICE SIGNAL OBSERVATIONS

BACKGROUND

Providing on-street parking navigation options is an area of interest for many navigation service providers and original equipment manufacturers (OEMs). To help provide such options, service providers often collect data on parking events (e.g., park-in or park-out events) to estimate parking availability information. However, data on parking events traditionally has been difficult to obtain because such data is often dependent on having an extensive network of installed parking sensors or a large of number of probe vehicles reporting parking events. Accordingly, service providers face significant technical challenges to collecting parking event data in a way that minimizes resource burdens associated with fixed parking sensors or maintaining probe vehicle networks.

Some Example Embodiments

Therefore, there is a need for an approach for estimating parking events from already available data, such as mobile device signal data that can be provided by existing cellular or other wireless networks.

According to one embodiment, a method comprises receiving a signal strength profile of a user device with respect to a location-fixed communication equipment (e.g., a base station of a cellular network or other wireless access point). The signal strength profile, for instance, comprises signal strength data for the user device measured over a time series by the location-fixed communication equipment. The method also comprises processing the signal strength profile to determine a signal event (e.g., a signal strength change or fluctuation) over the time series. The method further comprises identifying a mobility event with respect to a mode of transportation (e.g., a vehicle parking event such as a park-in or park-out event) occurring in a geographic area covered by the location-fixed communication equipment based on the signal event.

According to another embodiment, an apparatus comprises at least one processor, and at least one memory including computer program code for one or more computer programs, the at least one memory and the computer program code configured to, with the at least one processor, cause, at least in part, the apparatus to receive a signal strength profile of a user device with respect to a location-fixed communication equipment (e.g., a base station of a cellular network or other wireless access point). The signal strength profile, for instance, comprises signal strength data for the user device measured over a time series by the location-fixed communication equipment. The apparatus is also caused to process the signal strength profile to determine a signal event (e.g., a signal strength change or fluctuation) over the time series. The apparatus is further caused to identify a mobility event with respect to a mode of transportation (e.g., a vehicle parking event such as a park-in or park-out event) occurring in a geographic area covered by the location-fixed communication equipment based on the signal event.

According to another embodiment, a non-transitory computer-readable storage medium carries one or more sequences of one or more instructions which, when executed by one or more processors, cause, at least in part, an apparatus to receive a signal strength profile of a user device with respect to a location-fixed communication equipment (e.g., a base station of a cellular network or other wireless access point). The signal strength profile, for instance, comprises signal strength data for the user device measured over a time series by the location-fixed communication equipment. The apparatus is also caused to process the signal strength profile to determine a signal event (e.g., a signal strength change or fluctuation) over the time series. The apparatus is further caused to identify a mobility event with respect to a mode of transportation (e.g., a vehicle parking event such as a park-in or park-out event) occurring in a geographic area covered by the location-fixed communication equipment based on the signal event.

According to another embodiment, an apparatus comprises means for receiving a signal strength profile of a user device with respect to a location-fixed communication equipment (e.g., a base station of a cellular network or other wireless access point). The signal strength profile, for instance, comprises signal strength data for the user device measured over a time series by the location-fixed communication equipment. The apparatus also comprises means for processing the signal strength profile to determine a signal event (e.g., a signal strength change or fluctuation) over the time series. The apparatus further comprises means for identifying a mobility event of with respect to a mode of transportation (e.g., a vehicle parking event such as a park-in or park-out event) occurring in a geographic area covered by the location-fixed communication equipment based on the signal event.

According to another embodiment, a method comprises receiving signal strength data for a plurality of user devices located with a geographic area covered by a location-fixed communication equipment providing the signal strength data. The method also comprises processing the signal strength data to determine one or more signal fluctuations. The method further comprises identifying one or more park-in events, one or more park-out events, or a combination thereof occurring in the geographic area based on the one or more signal fluctuations. The method further comprises filtering one or more false positive events from the one or more park-in events, the one or more park-out events, or combination thereof based a characteristic determined from the signal strength data, an external data source, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for estimating parking or other mobility events based on device signal observations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
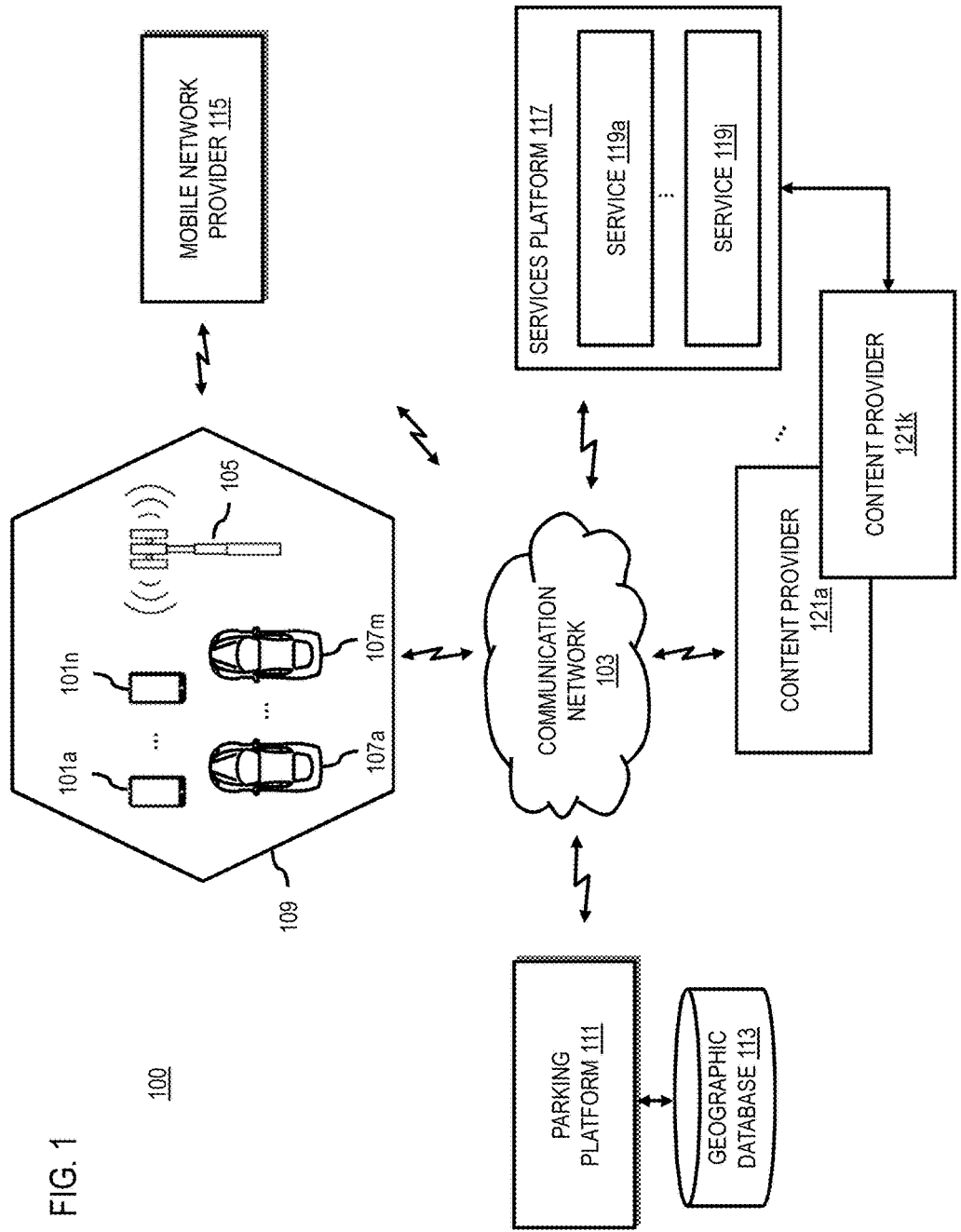
FIG. 1 is a diagram of a system capable of estimating parking or other mobility events based on device signal observations, according to one embodiment.

FIG. 1 is a diagram of a system capable of estimating parking or other mobility events based on device signal observations, according to one embodiment. Historically, on-street parking (OSP) availability information can be particularly difficult to obtain. This is because parking availability information has traditionally been determined from parking space observations derived from fixed sensors or vehicle probe data (e.g., vehicle telemetry indicating speed, heading, etc. collected from vehicles parking in an area). However, fixed parking sensors are currently installed on a very limited number of streets or parking areas, leading to potentially large gaps in parking availability coverage areas. Similarly, parking availability determined from GPS probe data from vehicles can be inconclusive when the ratio between vehicles reporting probe data for determining parking events versus total vehicles in an area is unknown.

Other traditional methods for obtaining parking availability can be based on directly surveying vehicles or drivers for parking data either manual or automated surveys. For example, manual survey methods can include crowd sourced reporting of observed parking data (e.g., available parking spots, park-in events, park-out events, etc.). However, such methods are dependent on participation rates from drivers which can be unknown and lead to the same problem of not knowing the ratio of reporting drivers to total drivers in the area. Similarly, automated survey means are dependent on vehicle hardware unavailable to most vehicles using OSP, thereby also potentially leading to unknown or inconclusive information on reporting vehicles versus total vehicles in an area. This unknown ration, in turn, can lead to the survey data providing only limited statistical insight.

In other words, the parking availability problem is mainly difficult to solve because there currently is not sufficient market penetration of traditional vehicle tracking methods that could reveal parking events (e.g., park-in events indicating when a vehicle parks in an area, and park-out events indicating when a vehicle leaves a parking spot in the area). Therefore, a significant problem is that the ratio between vehicles reporting parking events versus total vehicles in an area is unknown. As a result, even if there are several vehicles reporting park-in/park-out events on a road segment, there is no information regarding how many vehicles in the area are reporting versus how many vehicles are not reporting such events to provide a more complete assessment of parking availability in the area.

To address the problems described above, a system 100 of FIG. 1 introduces a capability to determine parking events or other mobility events by detecting signal fluctuations or other signal events measured between user mobile devices [e.g., user equipment (UEs) 101a-101n, also collectively referred to as UEs 101] and the infrastructure of a communication network 103 (e.g., communication equipment such as a cellular base station 105). The system 100 then processes the detected signal events to determine whether they exhibit characteristics or patterns that are indicative of parking events (e.g., park-in events or park-out events) and/or other similar mobility events (e.g., transition between different modes of transportation, entry into buildings, etc.).

In one embodiment, the communication network 103 can be a mobile phone network or any other wireless communication network (e.g., WiFi, Bluetooth, near field communication (NFC), etc.) that is capable of measuring signals transmitted from the UE 101. For example, mobile phone networks are nowadays ubiquitous and tend to offer full coverage in areas where parking availability information is desirable. As a result, almost every driver/passenger of a vehicle (e.g., vehicles 107a-107m, also collectively referred to as vehicles 107) carries a mobile phone or device such as a UE 101. In the normal operation of mobile phone networks, mobile operators typically obtain constant signal measurements from each UE 101 connected to the base station 105 (e.g., a location-fixed infrastructure communication equipment) within a coverage cell 109 (e.g., a geographic area served by the base station 105). The system 100 can use these signal measurements or observations to determine a more complete view of parking availability in the geographic area of the corresponding coverage cell 109. This is because almost every vehicle 107 is likely to have at least one driver or passenger carrying a UE 101. Therefore, the ratio of observed vehicles 107 to total vehicles 107 in the coverage cell 109 would be near 1:1 to give a more complete picture. In other words, the system 100 can use mobile phone data (e.g., signal strength data) to establish the current park-in/park out events inside a cell 109, as well as a measure of how many vehicles 107 are simply passing through said cell 109. Although only one cell 109 is shown in FIG. 1, it is contemplated that the embodiments described herein can be extended to a plurality of cells 109 to determine parking events over a wide geographic area.

As noted above, the system 100 processes the signal observations to determine patterns indicative of parking events. In one embodiment, the patterns are related to signal fluctuations or changes that can be observed when a UE 101 moves out of or into a vehicle 107. For example, a substantive increase/decrease of the signal strength should be observable or otherwise detectable when the user of the vehicle 107 embarks/disembarks. The signal fluctuation patterns are based, for instance, on the Faraday Cage effect that a vehicle 107 has on electromagnetic signals such as the signals transmitted between a UE 101 and base station 105. The Faraday Cage effect causes the measured signal strength (e.g., as measured from a location-fixed base station 105 or equivalent communication equipment) to be relatively lower when the UE 101 is inside the vehicle 107 and relatively higher when UE 101 is outside the vehicle 107.

Figure 2:
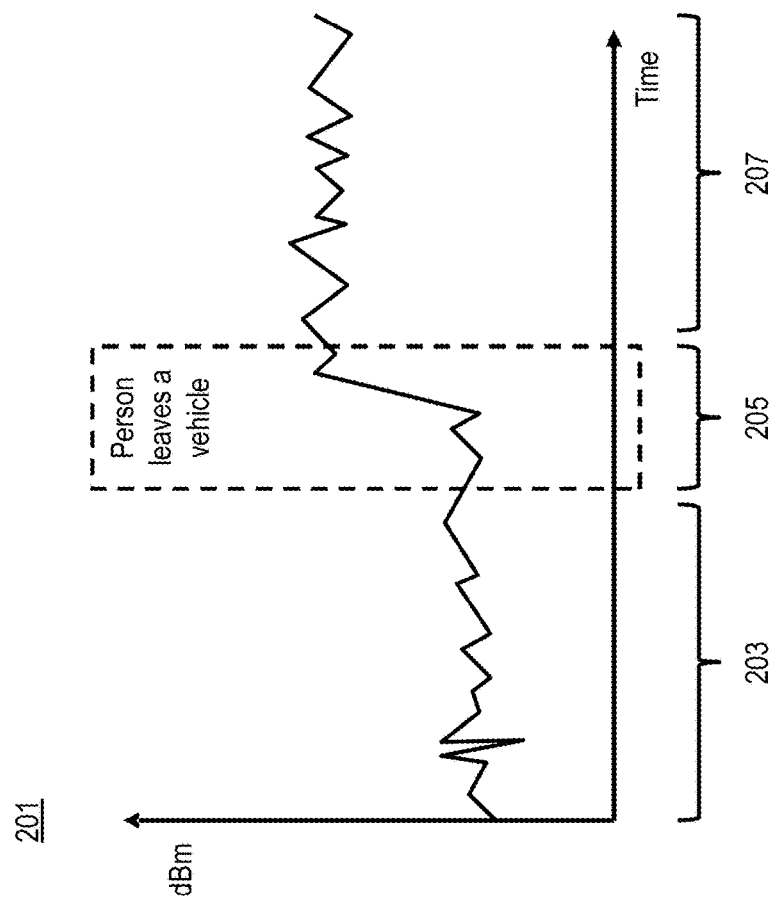
FIG. 2 is a diagram illustrating an example signal profile used for estimating parking or other mobility events, according to one embodiment.

An example of the Faraday Cage effect is illustrated in the signal profile 201 of FIG. 2. The signal profile 201 plots the signal strength of a UE 101 as measured over time by a base station 105 of a coverage cell 109 in which the UE 101 is located. More specifically, the signal profile 201 illustrates a time series of signal measurements for a park-in event (e.g., an event characterized by a person being inside a vehicle 107 and then leaving the vehicle 107 after parking). In this example, the UE 101 is carried by a person who is inside the vehicle 107 for a first time period 203. As a result, the measured signal strength of the UE 101 is relatively low because of the Faraday Cage effect caused by being fully inside the vehicle 107. As the person carrying the UE 101 leaves the vehicle 107 (e.g., leaving after the vehicle 107 is parked), the signal strength begins to increase during the time period 205. In the time period 207, the person and UE 101 are fully outside of the vehicle 107 and the signal strength is measured to be relatively higher. In one embodiment, the system 100 can look for this signal pattern in a signal profile being evaluated to identify a park-in event. Although not shown, a park-out event would be characterized by a similar signal pattern but in reverse (e.g., a UE 101 that is initially outside of the vehicle 107 being brought inside the vehicle 107 as the person carrying the UE 101 returns to a parked vehicle and prepares to leave a parking spot.

In addition to signal strength, the system 100 can use other signal characteristics or events to further refine the identification of a parking or mobility event. For example, these signal measurement data from typical mobile phone networks can allow for mobile device tracking with a relatively coarse accuracy (~200 m). The tracking or movement data can be further used to classify whether an observed signal profile is indicative of a parking or mobility event or predict the identified event with more specificity (e.g., whether the identified parking event is a park-in or park-out event). In another example, handovers between cells 109 can identify further movement patterns of devices for classifying parking or mobility events. The handover time between two base stations 105 (e.g., two location-fixed communication equipment) can indicate when a UE 101 crossed over into a coverage area or the current base station 105, which in turn can be used to determine a speed, movement, dwell time (e.g., how long a UE 101 has been in the coverage cell 109), etc. It is noted that the example of other characteristics described above are provided by way of illustration and not as limitations. Accordingly, other factors related to the signals, UE 101, vehicle 107, base station 105, coverage cell 109, etc. can contribute to varying signal measurements, which can in turn reveal some patterns classifying parking or other mobility events.

In one embodiment, signal fluctuations or events can be attributed to different causes (e.g., causes other than a parking or other mobility event that is being monitored for). Accordingly, given that the base station 105 or other location-fixed communication equipment (e.g., WiFi access point) would only observe timestamped signal strength measurements for a UE 101 within the base station 105's coverage cell 109, further conditions and data from alternate sources can be considered in order to filter false positives appropriately. By way of example the false positive filtering process can use signal profile data and/or other alternate data sources to reduce potential false positive vehicle parking events caused by signal events resulting from pedestrian activity, people entering/exiting buildings instead of vehicles, poor/good reception areas in the coverage cell 109, taxi/delivery vehicle movements, public transport (e.g., underground trains, buses, etc.), and/or the like. Additional details of various embodiments of the false positive filtering process are described further below.

In one embodiment, the system 100 includes a parking platform 111 with connectivity to a geographic database 113 for providing parking or mobility information including parking availability information for geographic areas mapped in the geographic database 113. The parking platform 111 can be a standalone component, a component of a mobile network provider system 115, a component of a services platform 117 and/or any of its services 119a-119j (also collectively referred to as services 119), a component of the UE 101, a component of the vehicle 107, and/or another component of the system 100.

Figure 3:
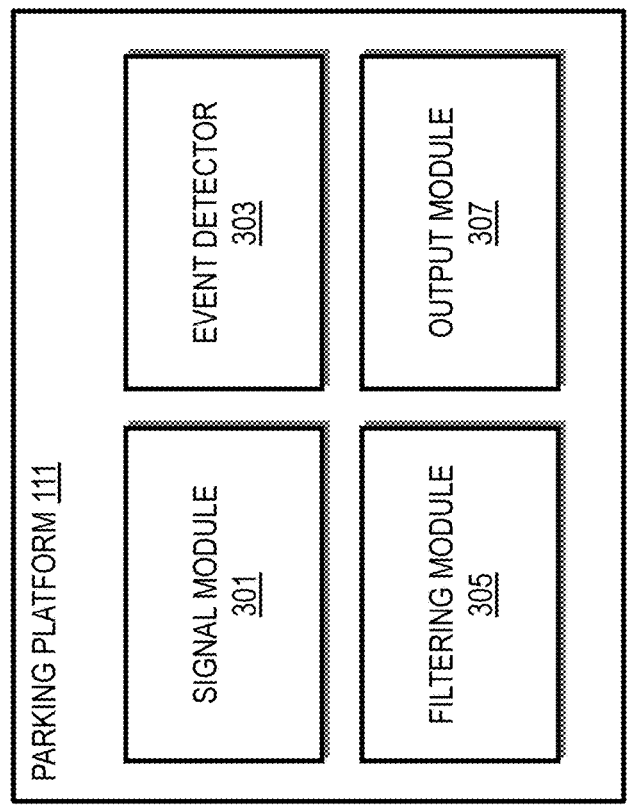
FIG. 3 is a diagram of the components of a parking platform, according to one embodiment.

FIG. 3 is a diagram of the components of a parking platform 111, according to one embodiment. By way of example, the parking platform 111 includes one or more components for estimating parking or other mobility events according to the various embodiments described herein. It is contemplated that the functions of these components may be combined or performed by other components of equivalent functionality. In this embodiment, the parking platform 111 includes a signal module 301, event detector 303, filtering module 305, and output module 307. The above presented modules and components of the parking platform 111 can be implemented in hardware, firmware, software, or a combination thereof. In one embodiment, one or more of the modules 301-307 may be implemented as a cloud-based service, local service, native application, or combination thereof. The functions of these modules are discussed with respect to FIGS. 4-7 below.

Figure 4:
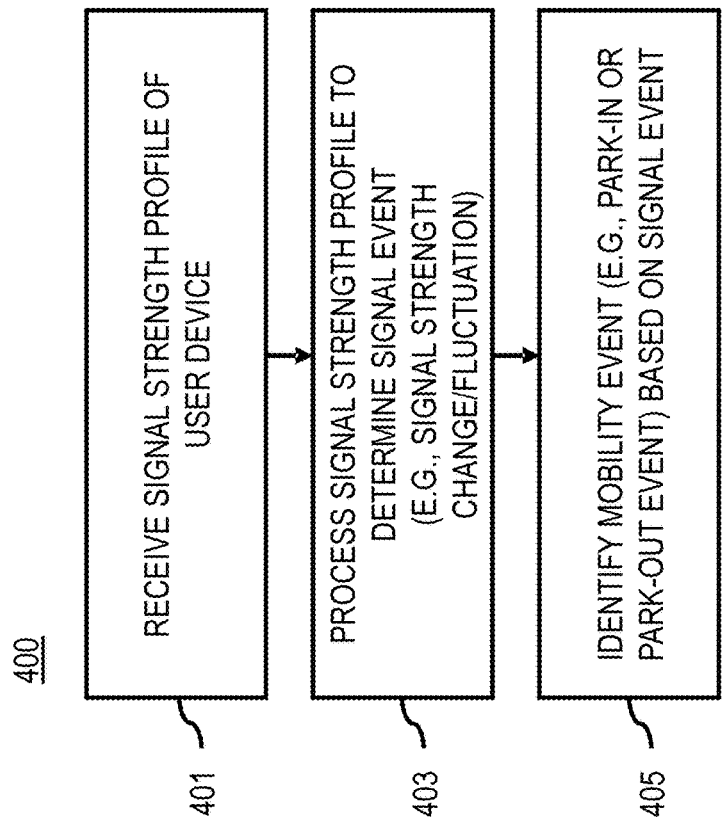
FIG. 4 is a flowchart of a process for estimating parking or other mobility events based on device signal observations, according to one embodiment.
Figure 10:
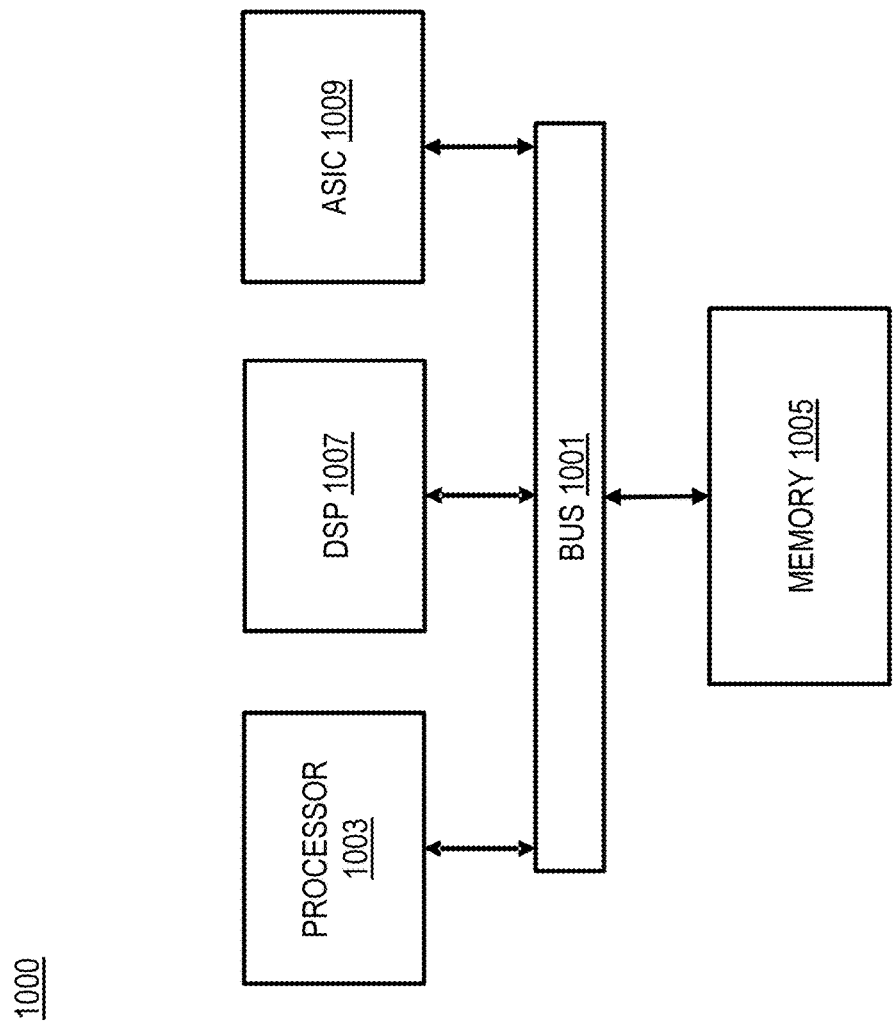
FIG. 10 is a diagram of a chip set that can be used to implement an embodiment.

FIG. 4 is a flowchart of a process for estimating parking or other mobility events based on device signal observations, according to one embodiment. In various embodiments, the parking platform 111 and/or any of the modules 301-307 of the parking platform 111 as shown in FIG. 3 may perform one or more portions of the process 400 and may be implemented in, for instance, a chip set including a processor and a memory as shown in FIG. 10. As such, the parking platform 111 and/or any of the modules 301-307 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In one embodiment, the process 400 can be based on, but does not require, one or more of the following general assumptions. One assumption is that all or a large portion of the users of the vehicles 107 carry a UE 101 (e.g., a mobile device) capable of transmitting to at least one location-fixed communication equipment (e.g., a base station 105 or other wireless access point) of a wireless communication infrastructure. As discussed above, this assumption is based on the ubiquity of mobile phone networks and mobile phones among the consumers and provides a basis for using the signal observations from these networks to give a more complete picture of parking or other mobility events related to the vehicles 107.

Another assumption can be that vehicle journeys extend long enough for signal measurements to be made over a time series or period that can capture parking or other mobility event. For example, in some embodiments, the vehicle journeys can also be long enough to provide enough signal data or movement data to track vehicle speed, dwell time, and/or other characteristics/parameters. For example, depending on the location tracking accuracy provided by base station 105 signal triangulation (e.g., typically ~200 m in current mobile phone networks), the journey can extend for a few hundred meters or, in some cases, extend long enough to include a handover between coverage cells 109 of different base stations 105. A handover, for instance, occurs when a UE 101 changes location, and the base station 105 listens for a signal sent from the UE 101 and negotiates which base station 105 is best able to communicate with the UE 101. As the UE 101 moves, the best base station 105 that can communicate also changes because the base stations are location-fixed (e.g., installed at a fixed known geographic location) while the UE 101 is mobile. This handover can be common in urban areas, where base stations 105 typically cover geographic areas extending approximately 500 m from the base station 105, and mobility of UEs 101 is high.

Based on one or more of the above assumptions, in step 401, the signal module 301 of the parking platform 111 receives a signal strength profile of a UE 101 with respect to a location-fixed communication equipment. In one embodiment, the location-fixed communication equipment is a base station 105 of a mobile phone network and/or any other type of wireless access point (e.g., WiFi access point). Each location-fixed communication equipment is typically installed at a known or fixed location and covers a defined geographic area (e.g., a coverage cell 109). As used herein, the terms location-fixed communication equipment, base station 105, and wireless access point are used interchangeably and synonymously in the description of the embodiments. In one embodiment, the received signal strength profile comprises signal strength data for the UE 101 measured over a time series by the location-fixed communication equipment. As previously described, in the normal operation of a mobile phone network or equivalent communication network, the location-fixed communication equipment is in near constant communication (e.g., transmitting and/or receiving radio frequency (RF) signals to and from the UE 101) with the UEs 101 in its coverage area or cell 109 to route calls, provide data services (e.g., to applications or services running on the UE 101), etc. As part of this process, the location-fixed communication equipment measures signal strength and/or other signal properties (e.g., frequency, jitter, etc.). These signal measurements are typically time-stamped to provide a time sequence or series of signal observations over a period of time (e.g., as shown in the example of FIG. 2). This signal data can then be provided to the signal module 301 as a signal profile or signal strength profile of a UE 101. In one embodiment, multiple signal profiles can be received for multiple UEs 101 operating in a given coverage cell 109 of a base station 105.

In step 403, the event detector 303 processes the received signal profile to determine one or more signal events. In one embodiment, a signal event refers to any detectable property or change in property of the signal observations in the signal profile of a UE 101. For example, as mentioned above, a sudden signal strength increase or decrease can be detectable from the signal observations of a base station 105 after a user exits or enters a vehicle 107 carrying a UE 101 (e.g., because of the Faraday Cage effect). This signal strength increase or decrease is an example of a signal event. Other examples of signal events include, but are not limited to, changes in signal frequency, jitter, etc.

In step 405, the event detector 303 identifies a mobility event with respect to a mode of transportation occurring in a geographic area covered by the location-fixed communication equipment based on the determined signal event. A mobility event, for instance, can include any type of movement of the UE 101 and/or things associated with the UE 101 (e.g., a person carrying the UE 101, a vehicle 107 in which the person is riding, etc.) that can be determined from detected signal events including, but not limited to, parking events such as park-in or park-out events. In one embodiment, the event detector 303 can identify events by comparing the detected signal events against reference signal patterns associated with known events. For example, a park-in event can be identified based on determining that the signal event or signal strength change is a signal strength increase (e.g. an increase greater than a predetermined threshold value), and a park-out event can be identified based on determining that the signal strength change is a signal strength decrease (e.g., a decrease greater than a predetermined threshold value).

It is contemplated that the event detector 303 can use any process for performing the comparison of the detected signal events against known patterns. For example, the comparison can be based on simple pattern matching, or based on more complex processes such as machine learning. In the machine learning case, for instance, the event detector 303 can use the characteristics of the signal profile, the UE 101, vehicle 107, base station 105, coverage cell 109, etc. as features of the machine learning model (e.g., neural networks, support vector machines, decision trees, etc.). The model can then be trained using ground truth data (e.g., actual known park-in/park-out events, or other mobility events) collected from various coverage cells 109. For example, the ground truth data can include positive and negative examples of such parking or mobility behaviors that are labeled by experimentally sending out a surveying crew to replicate the behavior, document it, and correlate it with base station observations and other features. The event detector 303 can then use the trained machine learning model to predict the probability of the occurrence of a parking or other mobility event based on the features associated with a received signal profile of a UE 101.

Figure 5:
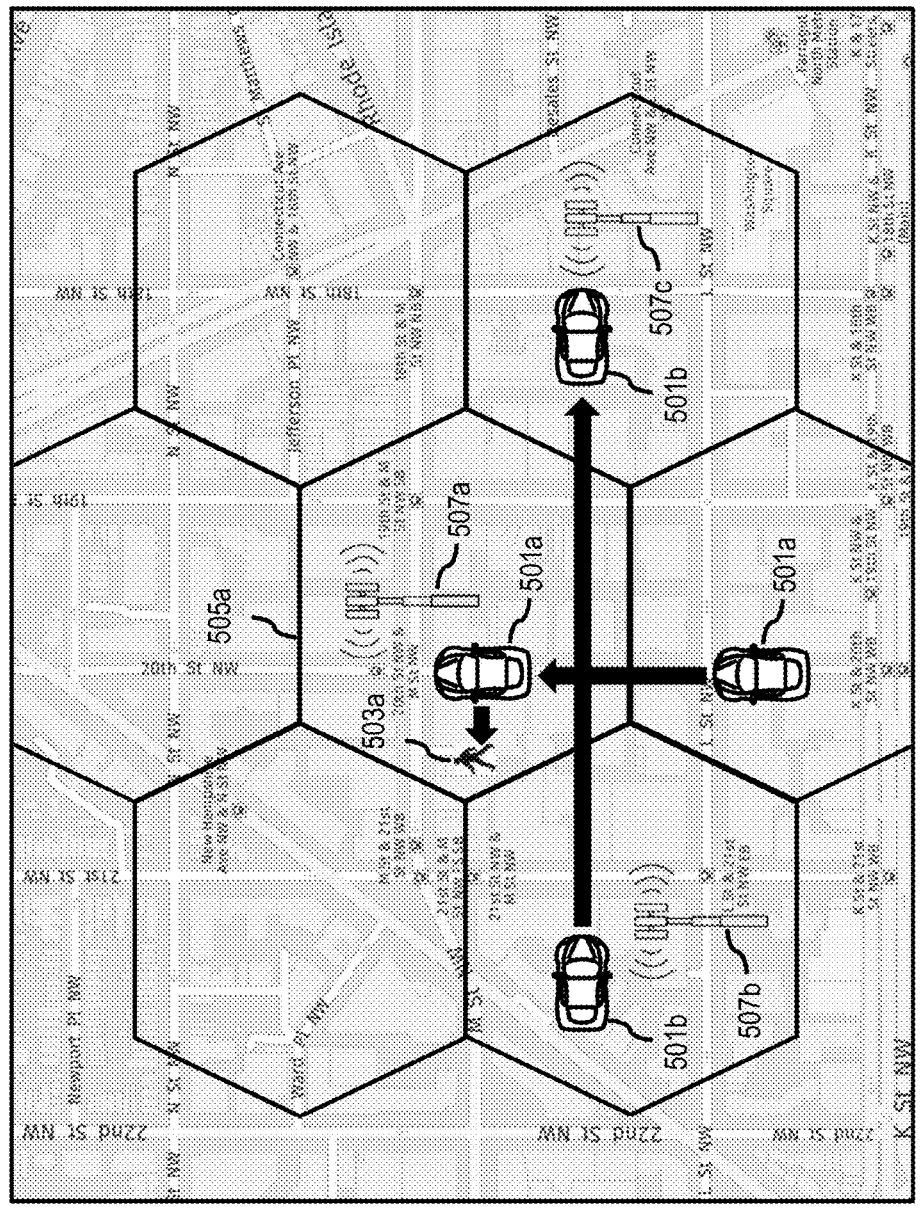
FIG. 5 is a diagram illustrating example parking events, according to one embodiment.

FIG. 5 is a diagram illustrating example parking events that can be identified, according to one embodiment. As depicted, a vehicle 501a with a driver 503a who is carrying a mobile device enters a coverage area 505a of a base station 507a. In this example, the base station 507a should register a signal increase as a result of the mobile device leaving the vehicle 501a with the driver 503a when the vehicle 501a parks in the coverage area 505a (e.g., a park-in event). In one embodiment, such a signal fluctuation spike may be attributed to other causes (i.e., causes other than leaving the vehicle 501a after a parking event). Accordingly, the event detector 303 can evaluate the previous handover situation (e.g., in this case, handover from base station 507b to 507a) has happened within a timeframe consistent with a mobile phone being inside the vehicle 501a. In other words, rough estimates of the mobile device moving through the cells are also possible, from which a speed consistent with driving can be observed and used to identify the parking event. In one embodiment, the combination of signal and handover observations provides an observation of a park-in event. To provide these observations, the signal module 301 can collect the signal profile for a sufficient period of time to capture the signal event and/or the handover events.

In one embodiment, signal spikes or drops can serve as an initial indicator to review the signal profile backwards in time. In other words, the event detector 303 can initiate additional processing of the signal strength profile backwards in time based on determining that signal strength change. The identifying of the park-in event or the park-out event is further based on the additional processing of the signal strength profile backwards in time. For example, the additional processing the signal strength profile comprises determining whether a calculated speed of the user device is within a speed range associated with driving the vehicle (e.g., based on a handover time between cell edges traversed by the vehicle).

In contrast, the vehicle 501b is observed in a handover between cells (e.g., from base station 507b to 507a to 507c) at a speed consistent with driving. In this example, as the vehicle 501b drove through the cell corresponding to base station 507a within a timeframe consistent with driving, a signal spike was not observed. As a result, the event detector 303 determines that a parking event did not take place for this vehicle 501b because the signal event does not match the signal fluctuation associated with a parking event taking place. Similarly, if the person is carrying a UE 101 while riding a bicycle, a signal spike (and therefore a parking event) would not have been detected because there would be no Faraday Cage effect created by the bicycle, and thus no parking event would be identified. The park-out case would experience a signal event that is a signal drop rather than a spike (e.g., in the case of the park-in event) but would work in an analogous manner.

While the examples discussed herein are primarily related parking events, it is contemplated that the embodiments are also applicable to any other type of mobility event in which a UE 101 can be carried. Examples of other mobility events can include, but are not limited to, transition from one mode of transportation to another mode [e.g., from a non-vehicle mode of transportation (e.g., walking, bicycling, etc.) to a vehicle-based mode of transportation or vice version], "cruising for parking" events where a driver is circling in an area to find an open parking space, etc. For example, in the cruising for parking scenario, the event detector 303 can use additional information such as time and area when cruising for parking has been observed to occur to enable statistical prediction of parking pressure in a given area. Other features can include population density in coverage cells 109 which is usually correlated such that higher densities are associated with higher parking demand or pressure.

Figure 6:
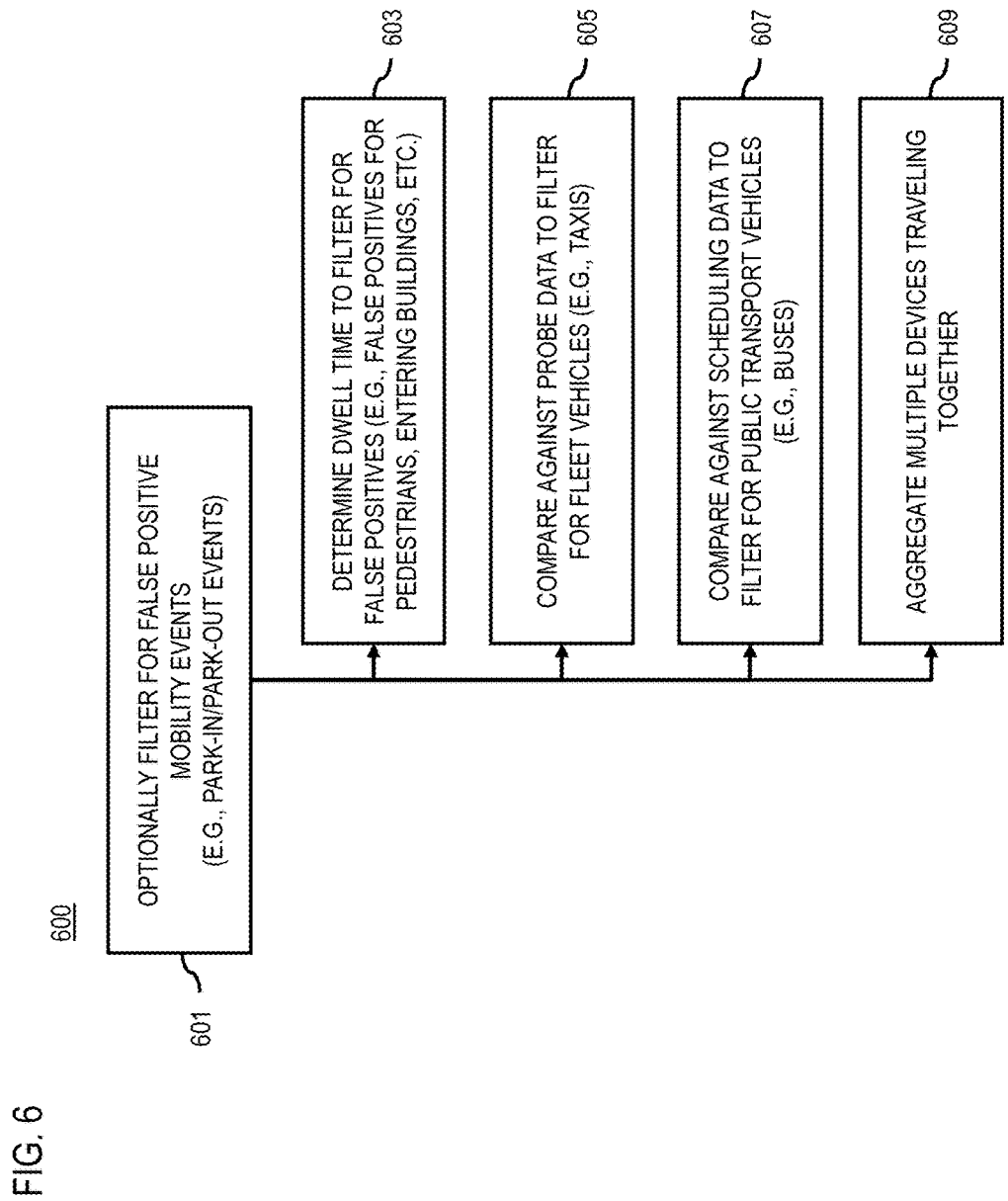
FIG. 6 is a flowchart of an optional process for filtering false positive events from estimated parking or other mobility events, according to one embodiment.

In one embodiment, the process 400 for estimating mobility events from signal observations can be susceptible to false positives (e.g., identifying some signal profiles as indicative of a mobility events when they are not). FIG. 6 is a flowchart of an optional process for filtering false positive events from estimated parking or other mobility events, according to one embodiment. In various embodiments, the parking platform 111 and/or any of the modules 301-307 of the parking platform 111 as shown in FIG. 3 may perform one or more portions of the process 600 and may be implemented in, for instance, a chip set including a processor and a memory as shown in FIG. 10. As such, the parking platform 111 and/or any of the modules 301-307 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all of the illustrated steps.

Figure 7:
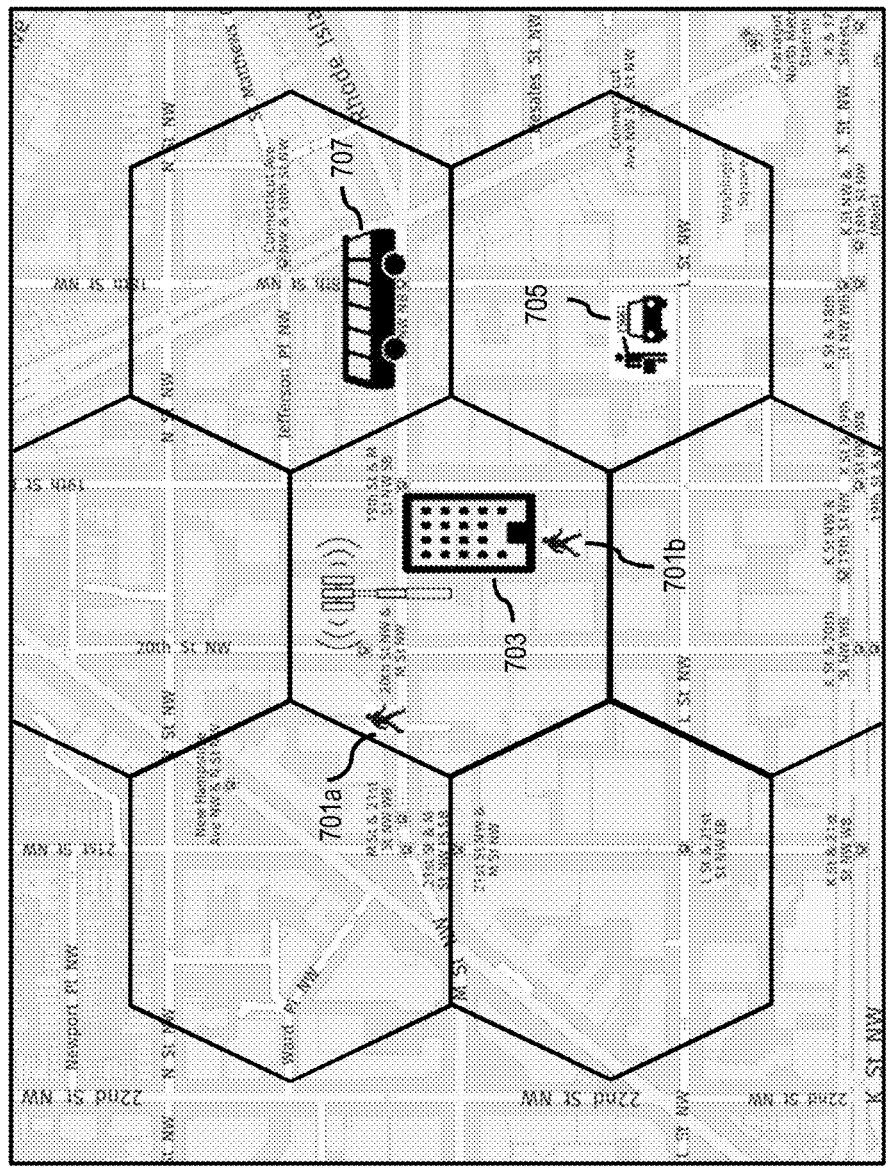
FIG. 7 is a diagram illustrating an example geographic area with multiple potential false positive sources for estimating parking or other mobility events, according to one embodiment.

As depicted in FIG. 7, there can multiple sources of false positives when estimating parking or mobility events from signal observations in coverage cell because people carry mobile devices (e.g., UEs 101) in many different scenarios. For examples, pedestrians 701a and 701b can carry UEs 101 that can have signal fluctuations for reasons other than the Faraday Cage effect associated with embarking or disembarking from vehicles 107. For example, signals can fluctuate with differences in cell phone coverage within the cell, when a pedestrian 701b enters or exits a building 703 or other structure where cell phone reception can vary greatly, and/or the like. In other cases, people may be embarking/disembarking from taxis 705 or other fleet vehicles that offer similar signal patterns. Similarly, people may be embarking/ disembarking from public transport vehicles 707 (e.g., buses, underground public transport, etc.) that also can result in similar signal profiles.

Accordingly, in step 601, the filtering module 305 of the parking platform 101 can optionally filter for false positives from mobility events determined form signal observations. In one embodiment, the filtering module 305 can apply different filtering processes depending on the potential false positive source.

For example, a pedestrian 701*b* would be characterized by dwelling inside (or between two) cells for a prolonged period of time, as the person would not travel fast enough within the area. Accordingly, in step 603, the filtering module 305 can process the signal strength profile of a UE 101 to determining a dwell time of the user device in the geographic area covered by the location-fixed equipment. The identifying of the parking or mobility event (e.g., a park-in event or the park-out event) can further based on the dwell time. For example, the filtering module 305 can determined that a potential parking event is a false positive if a corresponding dwell time is greater than a range typically associated with a vehicle 105 or otherwise associated with a range commonly observed for pedestrians 701. In another embodiment, the filtering module 305 can also determine other characteristics of the signal profile to determine whether to filter the corresponding event as false positive. The signal profile, for instance, should exhibit smooth gains and losses, contrary to the rapid change when entering/exiting a car.

Another potential false positive source is from people entering/exiting buildings 703 because cell signal reception can vary greatly between inside and outside of buildings 703 or similar structures (e.g., poor/good reception in buildings). As a result, a device entering or exiting a building 703 or similar structure may exhibit a similar signal change as when parking. However, the person carrying such a device would also dwell inside a coverage cell, both before and after entering the building 703. This condition could then be used to discard a candidate event as a false positive.

Yet another potential false positive source are fleet vehicles such as taxis 705 or delivery vehicles. The pattern of a passenger getting off a vehicle 105 would not be different if the passenger leaves a taxi 705 or if the driver parks the car. However, fleets typically do report their positions via probe data (e.g., GPS data or equivalent) in a constant and reliable manner, with enough detail to determine stops, dwell times and presence in a coverage cell. In step 605, the filtering module 305 can process probe data collected from one or more fleet vehicles in the geographic area covered by the location-fixed communication equipment to determine that the vehicle is a fleet vehicle. For example, for each taxi/delivery vehicle detected in the cell (reported via probes), a detection through signal observation data can be ignored.

Another potential false positive source are public transport vehicles 707 (e.g., underground public transport trains, buses, etc.). Accordingly, in step 607, the filtering module 305 can process public transport scheduling data to determine that the vehicle associated with a detected event is a public transport vehicle 707. In other words, base station or signal events can be correlated with schedules or real-time information relating to public transport vehicles 707. People coming into the coverage cell via public transport may trigger similar mobility events because the signal observations of passenger UEs 101 would be similar to those used for determining the monitored events. By using the schedules/real-time data from public transport authorities, these events can be ignored if they fit within a time-frame and coarse location associated with a public transport stop. Larger underground installations and train stations usually have microstations as part of the mobile phone network for dealing with the increased subscriber numbers at such locations. In one embodiment, handovers between microstations and base stations can also be used as criteria to ignore/filter parking signal profiles as false positives.

Another potential false positive source are multiple devices traveling together in one vehicle. In this case, multiple users (e.g., family getting out of car, passengers leaving a public transport vehicle, etc.) can be aggregated. If multiple such signal events are detected within a very short timeframe and coming from roughly the same position, these can be consolidated into a single event. In other words, the filtering module 305 can aggregating detected signal events (e.g., signal strength changes) with one or more other signal strength changes or events associated with one or more other devices based on determining that the one or more other signal strength changes occur within a threshold time period, a threshold distance, or a combination thereof of the signal strength change (step 609).

After performing this filtering on the base station/signal data and/or events estimated therefrom, a measure of how many park-in/park-out events or other mobility events have occurred within a coverage cell is generated. In one embodiment, this output can be fed by the output module 307 into other known approaches that rely on such parking or mobility events (e.g., park-in/park-out events). These approaches, for instance, can be used for generating parking availability data, parking-related guidance instructions, and/or other related services. As discussed above, providing street parking navigation options is an area of interest for service providers, original equipment manufacturers (OEMs), and/or other navigation related companies. For example, looking for parking (e.g., on-street parking or parking in other types of parking facilities), particularly in urban or congested areas, can be stressful and difficult for drivers. In some cases, a significant amount of traffic congestion in cities (e.g., approximately 30% in some cases) can be caused by drivers circling around their intended destinations to look for available parking spaces. Accordingly, service providers (e.g., the services platform 117, services 119, and/or content providers 121*a*-121*k*) consider a service to provide parking availability for information to be a key differentiator from their competition. In one embodiment, this information can be generated from the parking events estimated from signal observations according to the embodiments described herein.

In one embodiment, the vehicles 107 and/or one or more UEs 101 associated with a vehicle 107 can act as probes traveling over a road network represented in the geographic database 113 to provide parking or mobility event data according to the various embodiments described herein. Although the vehicle 107 is depicted as an automobile, it is contemplated that the vehicle 107 can be any type of transportation vehicle manned or unmanned (e.g., motor cycles, buses, trucks, boats, bicycles, etc.) capable of carrying drivers and passengers with their respective UEs 101. For example, the UE 101 can be a standalone device (e.g., mobile phone, portable navigation device, wearable device, etc.) or installed/embedded in the vehicle 107. In one embodiment, the UE 101 and/or vehicle 107 may be configured with one or more sensors for determining parking data as a supplement to the embodiments for estimating parking or mobility events from signal observations described herein. By way of example, the sensors may include location sensors (e.g., GPS), accelerometers, compass sensors, gyroscopes, altimeters, etc.

In one embodiment, the sensors can also be used to detect and report status data about an operational state of the vehicle 107 to assist in determining when the vehicle 107 parks in or leaves a parking space. For example, a parking event may be detected when it is determined that a vehicle's is engine off, the key is outside of the car, the vehicle door is locked, and/or the like. In one embodiment, the UE 101 and/or vehicle 107 are assigned unique probe identifiers (vehicle ID or probe ID) for use in identifying, reporting, or transmitting estimated parking or mobility event data.

In one embodiment, when a UE 101 and/or vehicle 107 (e.g., via a navigation system, navigation application, and/or the like) requests instructions to find parking in a given area or location, the parking platform 111 can use estimated parking or mobility events (e.g., as generated according to the various embodiments described herein) to determine a parking availability in the area in which parking is requested. The parking platform 111 can then provide the estimated parking or mobility event data for determining parking availability to present in a mapping or navigation user interface. For example, the parking availability information can be used to route a user (e.g., routing to a nearest parking area to the user's destination with parking availability), to provide a better estimated time of arrival (ETA) at a given destination, etc.

In one embodiment, as noted above, the vehicles 107 are equipped with an embedded navigation systems or other navigation devices (e.g., a UE 101) that are capable of submitting requests for parking information (e.g., parking duration data, parking availability, etc.), and of guiding a driver of the vehicle 107 along a navigation route using the parking information. In one embodiment, as the driver navigates along the received route, the vehicles 107 and/or UE 101 (e.g., via a navigation application) may receive real-time updates on parking duration and/or parking availability data predicted for road links or street segments based on the parking/mobility events estimated from signal observations.

By way of example, the UE 101 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

By way of example, the communication network 103 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the parking platform 111 communicates with other components of the system 100 using well known, new or still developing protocols. In this context, a protocol includes a set of rules defining how the network nodes within the communication network 103 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
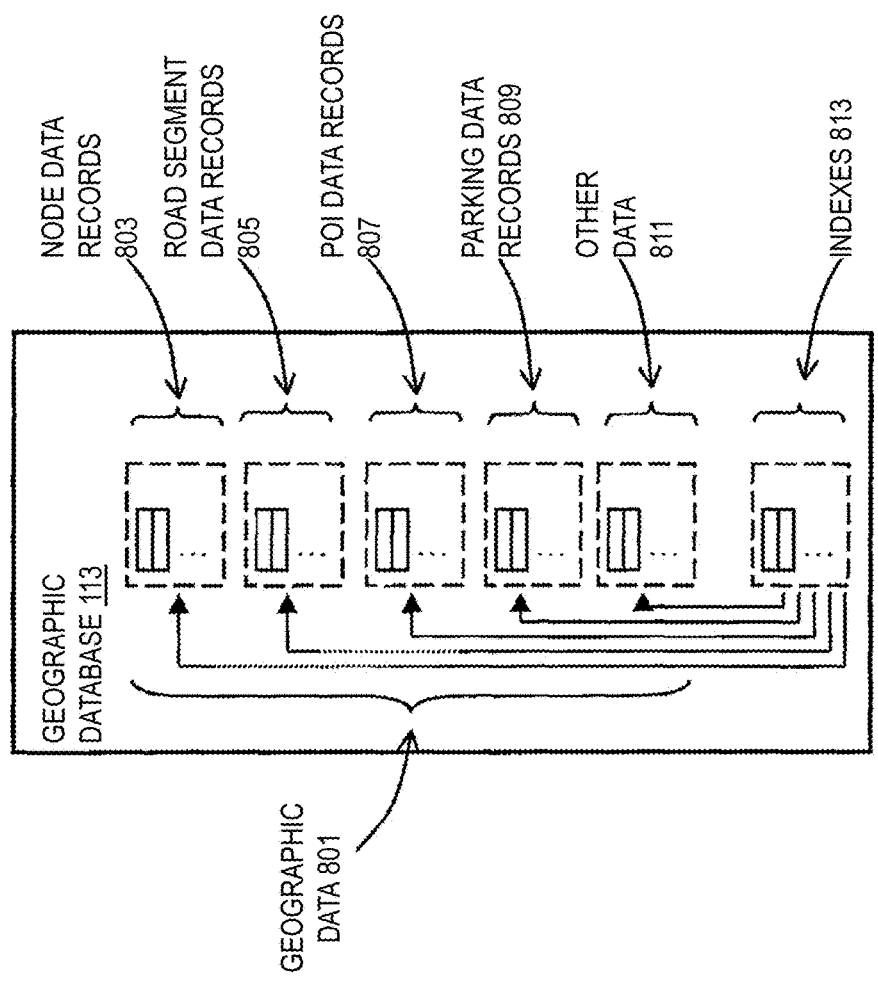
FIG. 8 is a diagram of a geographic database, according to one embodiment.

FIG. 8 is a diagram of the geographic database 113, according to one embodiment. In one embodiment, parking or mobility event, related signal observations, and/or any other information used or generated by the system 100 can be stored, associated with, and/or linked to the geographic database 113 or data thereof. In one embodiment, the geographic or map database 113 includes geographic data 801 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 113 includes node data records 803, road segment or link data records 805, POI data records 807, parking data records 809, other data records 811, and indexes 813, for example. More, fewer or different data records can be provided.

In one embodiment, these records store one or more of the data, parameters, and/or other map features used for measuring parking duration from anonymized data according to the various embodiments described herein. As described above, the features include, but are not limited to: (1) functional class of the link (e.g., principal arterial roadways, minor arterial roadways, collector roadways, local roadways, etc.); (2) POI density along a link (e.g., how many POIs are located along the link); (3) night life POI density along a link (e.g., how many POIs classified related to night life are along the link, such as restaurants, bars, clubs, etc.); (4) POI types along a link (e.g., what other types of POIs are located along the link); (5) population density along a link (e.g., the population of people living or working areas around the link); (6) road density along a link (e.g., how many roads are within a threshold distance of the link); (7) zoning (e.g., CBD, residential, etc.); (8) time epoch (e.g., segmentation by a defined period of time such as 15 mins, 1 hour, etc. periods of time); (9) weekday/weekend; (10) bi-directionality (e.g., whether traffic flows in two or multiple directions along the link); and (11) accessibility to public transit (e.g., proximity to subways, buses, transit stations, etc.).

In one embodiment, the other data records 811 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In one embodiment, the indexes 813 may improve the speed of data retrieval operations in the geographic database 113. In one embodiment, the indexes 813 may be used to quickly locate data without having to search every row in the geographic database 113 every time it is accessed.

In exemplary embodiments, the road segment data records 805 are links or segments representing roads, streets, or paths, as can be used in the calculated route or recorded route information. The node data records 803 are end points corresponding to the respective links or segments of the road segment data records 805. The road link data records 805 and the node data records 803 represent a road network, such as used by vehicles, cars, and/or other entities. Alternatively, the geographic database 113 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 113 can include data about the POIs and their respective locations in the POI data records 807. The geographic database 113 can also include data about places, such as cities, towns, or other communities, and other geographic features, such as bodies of water, mountain ranges, etc. Such place or feature data can be part of the POI data 807 or can be associated with POIs or POI data records 807 (such as a data point used for displaying or representing a position of a city).

In one embodiment, the parking data records 809 can include any data item used by the parking platform 111 including, but not limited to historical or estimated parking or mobility events and related signal profile data, trained predictive or machine learning models, parking data, travel segments within the parking areas to monitor, number of spaces, parking search behaviors, probe or trajectory data, travel profile information, user preferences, and/or the like.

The geographic database 113 can be maintained by the content provider in association with the service platform 117 (e.g., a map developer). The map developer can collect geographic data 801 to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database 113 or data 801 in the master geographic database 113 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems (e.g., associated with the vehicles 107 and/or UE 101).

For example, geographic data 801 or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a vehicle 107 and/or UE 101 (e.g., via a navigation application). The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 113 can be a master geographic database, but in alternate embodiments, the geographic database 113 can represent a compiled navigation database that can be used in or with end user devices (e.g., the vehicles 107 and/or UEs 101) to provide navigation-related functions including estimations of parking availability and waiting times to park in various parking areas. For example, the geographic database 113 can be used with the end user device (e.g., vehicle 107 and/or UE 101) to provide an end user with navigation and parking-related features. In such a case, the geographic database 113 and/or its related parking data/information can be downloaded or stored on the end user device, or the end user device can access the geographic database 113 through a wireless or wired connection (such as via a server and/or the communication network 103), for example.

In one embodiment, the geographic database 113 includes high resolution or high definition (HD) mapping data that provide centimeter-level or better accuracy of map features. For example, the geographic database 113 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, parking spots, lane markings, roadside objects such as sign posts, including what the signage denotes, etc. By way of example, the HD mapping data enable highly automated vehicles to precisely localize themselves on the road, and to determine road attributes (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 113 is stored as a hierarchical or multi-level tile-based projection or structure. More specifically, in one embodiment, the geographic database 113 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The processes described herein for estimating parking or mobility events from signal observations may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
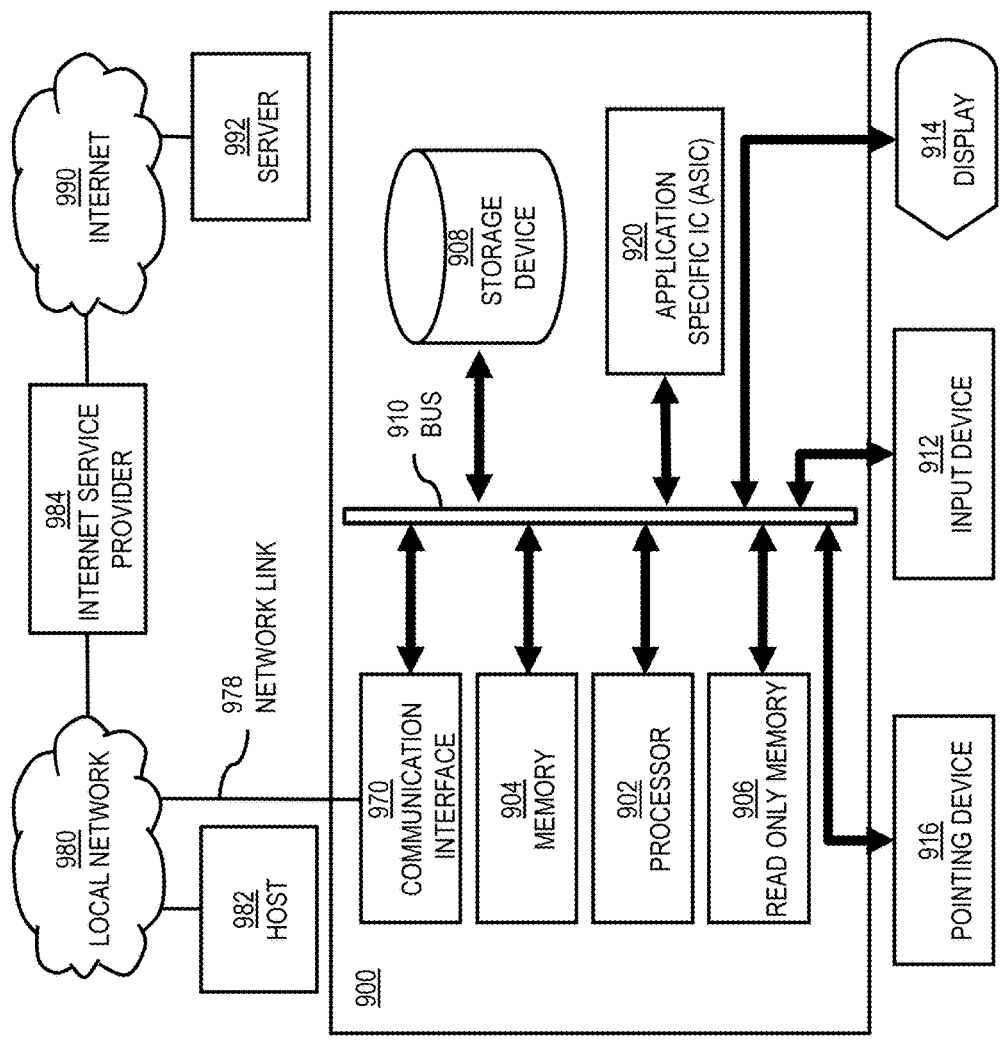
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to estimate parking or mobility events from signal observations as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to estimating parking or mobility events from signal observations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for estimating parking or mobility events from signal observations. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for estimating parking or mobility events from signal observations, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general, the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 103 for estimating parking or mobility events from signal observations.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment may be implemented. Chip set 1000 is programmed to estimate parking or mobility events from signal observations as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to estimate parking or mobility events from signal observations. The memory 1005 also stores the data associated with or generated by the execution of the inventive steps.

Figure 11:
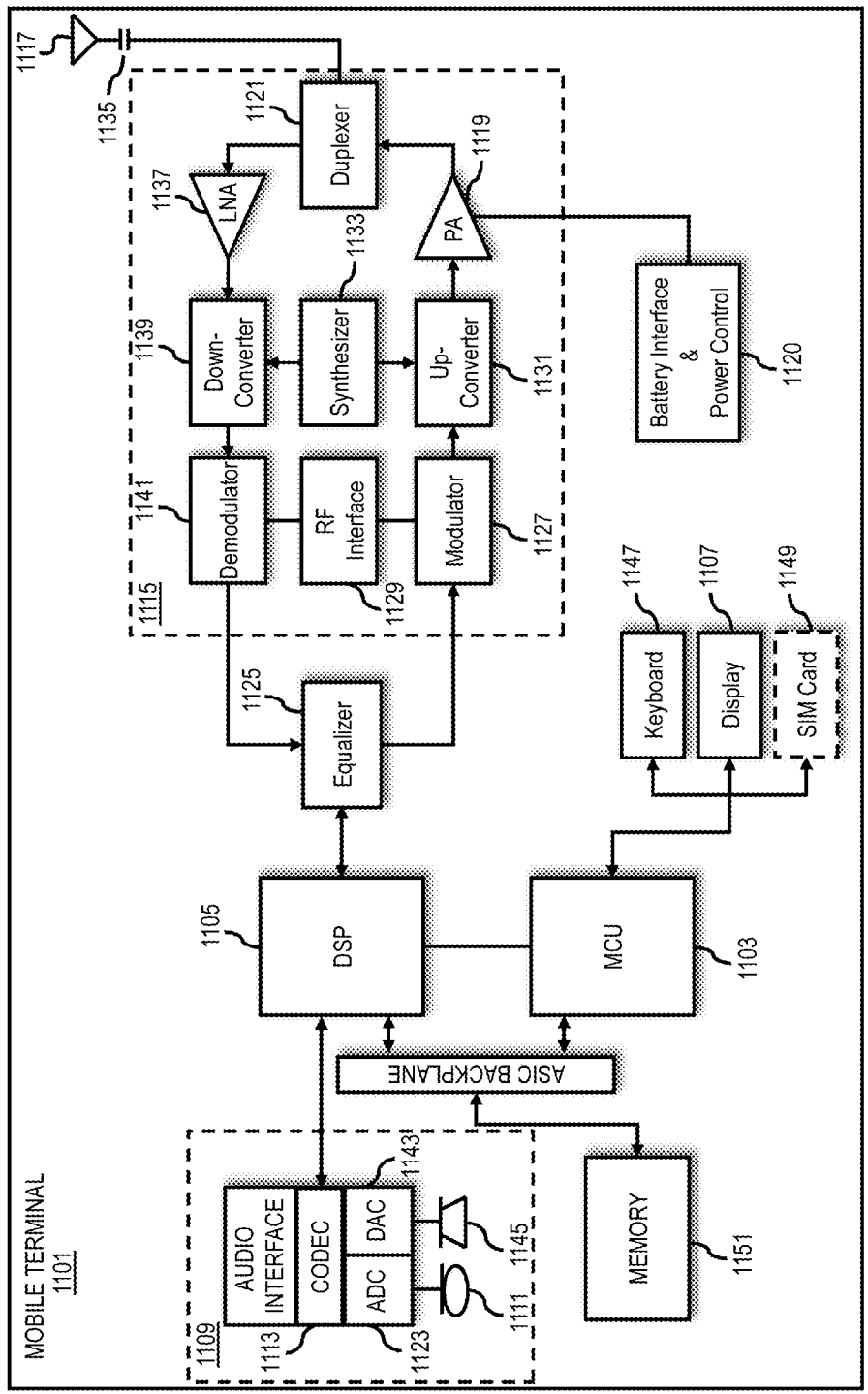
FIG. 11 is a diagram of a mobile terminal (e.g., mobile computer) that can be used to implement an embodiment.

FIG. 11 is a diagram of exemplary components of a mobile terminal 1101 (e.g., mobile phone, UE 101, etc.) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to estimate parking or mobility events from signal observations. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
   receiving a signal strength profile of a user device with respect to a location-fixed communication equipment, wherein the signal strength profile comprises signal strength data for the user device measured over a time series by the location-fixed communication equipment;
   processing the signal strength profile to determine a signal strength change over the time series; and
   identifying a park-in event or a park-out event of a vehicle occurring in a geographic area covered by the location-fixed communication equipment based on the signal strength change.

2. The method of claim 1, wherein the park-in event is identified based on determining that the signal strength change is a signal strength increase, and wherein the park-out event is identified based on determining that the signal strength change is a signal strength decrease.

3. The method of claim 1, wherein the location-fixed communication equipment is a base station, a wireless access point, or a combination thereof.

4. The method of claim 1, further comprising:
   initiating additional processing of the signal strength profile backwards in time based on determining that signal strength change,
   wherein the identifying of the park-in event or the park-out event is further based on the additional processing of the signal strength profile backwards in time.

5. The method of claim 4, wherein the additional processing of the signal strength profile comprises determining whether a calculated speed of the user device is within a speed range associated with driving the vehicle, and wherein the calculated speed is determined based on a handover of the user device between the location-fixed communication equipment and one or more neighboring location-fixed communication equipment.

6. The method of claim 1, further comprising:
   processing the signal strength profile to determine a dwell time of the user device in the geographic area covered by the location-fixed equipment,
   wherein the identifying of the park-in event or the park-out event is further based on the dwell time.

7. The method of claim 1, further comprising:
   processing probe data collected from one or more fleet vehicles in the geographic area covered by the location-fixed communication equipment to determine that the vehicle is a fleet vehicle; and
   filtering the park-in or the park-out event identified for the fleet vehicle.

8. The method of claim 1, further comprising:
   processing public transport scheduling data to determine that the vehicle is a public transport vehicle; and filtering the park-in or the park-out even identified for the public transport vehicle.

9. The method of claim 1, further comprising:
aggregating the signal strength change with one or more other signal strength changes associated with one or more other devices based on determining that the one or more other signal strength changes occur within a threshold time period, a threshold distance, or a combination thereof of the signal strength change.

10. The method of claim 1, wherein the processing of the signal strength profile comprises:
creating a feature set of the signal strength profile, the signal strength change, the user device, the location-fixed communication equipment, or a combination thereof; and
processing the feature set using a trained machine learning model to identify the park-in event or the park-out event.

11. The method of claim 1, wherein the signal strength profile indicates the user device being inside or outside of the vehicle for the identification of the park-in event or the park-out event.

12. An apparatus comprising:
at least one processor; and
at least one memory including computer program code for one or more programs,
the at least one memory and the computer program code configured to, with the at least one processor, cause the apparatus to perform at least the following,
receive a signal strength profile of a user device with respect to a location-fixed communication equipment, wherein the signal strength profile comprises signal strength data for the user device measured over a time series by the location-fixed communication equipment;
process the signal strength profile to determine a signal event over the time series; and
identifying a mobility event with respect to a mode of transportation occurring in a geographic area covered by the location-fixed communication equipment based on the signal event.

13. The apparatus of claim 12, wherein the apparatus is further caused to:
calculate a speed associated with user device based on a handover of the user device to the location-fixed communication from one or more neighboring communication equipment,
wherein the mobility event, the mode of transportation, or a combination thereof is further based on the calculated speed.

14. The apparatus of claim 12, wherein the mobility event is a transition from a non-vehicle based mode of transportation to a vehicle-based mode of transportation.

15. The apparatus of claim 14, wherein the apparatus is further caused to:
identify a park-in event or a park-out event associated with a vehicle in the geographic area covered by the location-fixed communication equipment based on the transition.

16. The apparatus of claim 12, wherein the signal event is a signal strength fluctuation that exceeds a threshold value.

17. A non-transitory computer-readable storage medium for generating parking occupancy data using a machine learning model, carrying one or more sequences of one or more instructions which, when executed by one or more processors, cause an apparatus to at least perform the following steps:
receiving signal strength data for a plurality of user devices located with a geographic area covered by a location-fixed communication equipment providing the signal strength data;
processing the signal strength data to determine one or more signal fluctuations; and
identifying one or more park-in events, one or more park-out events, or a combination thereof occurring in the geographic area based on the one or more signal fluctuations.

18. The non-transitory computer-readable storage medium of claim 17, wherein the apparatus is caused to further perform:
filtering one or more false positive events from the one or more park-in events, the one or more park-out events, or combination thereof based a characteristic determined from the signal strength data, an external data source, or a combination thereof.

19. The non-transitory computer-readable storage medium of claim 18, wherein the characteristic includes a dwell time within the geographic area covered by the location fixed communication equipment, and wherein the filtering of the one or more false positive events is based on determining that the dwell time is not within a dwell time range associated with a vehicle-based mode of transportation, determining that the dwell time is within a range associated with entry into a building, or a combination thereof.

20. The non-transitory computer-readable storage medium of claim 18, wherein the external data source includes fleet vehicle probe data, public transport scheduling data, or combination thereof; and wherein the filtering of the one or more false positive events is based on matching the one or more park-in events, the one or more park-out events, or a combination thereof against the fleet vehicle probe data, the public transport scheduling data, or a combination thereof.

* * * * *